United States Patent Office 2,759,896
Patented Aug. 21, 1956

2,759,896

PROCESS OF TREATING METAL MIXTURES

Arthur S. Hawkes and Ivar T. Krohn, Royal Oak, Mich., assignors to Ethyl Corporation, New York, N. Y., a corporation of Delaware No Drawing. Application September 28, 1951, Serial No. 248,864

1 Claim. (Cl. 252—303)

This invention relates broadly to a process of treating mixtures containing alkali metal in admixture with alkaline earth metal, and more specifically to a process for separating said metals and recovering the same in the form of valuable commercial products.

In the production of an alkali metal such as sodium by the electrolytic process it is common practice to utilize as the electrolyte a fused mixture of metal salts. For example, in the production of sodium a fused mixture of sodium chloride and calcium chloride is employed as the electrolyte. The purpose of adding the calcium chloride is to reduce the melting point of the electrolyte to a temperature below the boiling point of sodium. In this way the sodium produced at the cathode will be in the molten state and will not be vaporized at the temperature of the electrolytic mixture. While the use of the fluxing agent such as calcium chloride has this advantage, it does introduce additional difficulties into the overall process. The main difficulty is that calcium metal is produced at the cathode along with the sodium. This crude product is collected, cooled and subsequently purified so as to recover some of the sodium in substantially pure form. The residue or sludge which remains after this purification contains appreciable quantities of both sodium and calcium and it is the production of this sludge as a by-product which has presented a problem to the industry for a number of years.

This sludge contains on the average about 90–95 weight per cent sodium and calcium, the remainder consisting of the various salts and oxides of these metals and other impurities. The sodium content averages about 70 per cent by weight and the calcium content varies between 15 and 30 per cent. The sludge is in the form of crystals of calcium metal embedded in a matrix of sodium. As can be seen, this sludge represents an important economical factor in the electrolytic process, and it is extremely desirable to either convert this sludge into a usable commercial product or recover the metals therefrom in the form of valuable products. To date, however, attempts in this direction have generally been unsuccessful or impractical. For example, it has been the practice to recover some of the sodium content by feeding this sludge back to an electrolytic cell. This process is not only uneconomical but is extremely hazardous. It has also been proposed to dispose of the sludge by means of burning, but again the process is unattractive from an economical standpoint since the various salts and oxides which are produced in the burning process have no commercial value and must be wasted. The calcium content of the sludge is also important, but to date most processes for the recovery of this calcium have been unattractive from the commercial viewpoint because the by-products of such a process have not been sufficiently valuable. It can therefore be seen that heretofore no suitable economical method has been devised for treating or disposing of this sludge so as to obtain valuable products.

It is therefore an object of our invention to provide a new and improved process for economically treating mixtures containing alkali metal in admixture with alkaline earth metal whereby the metals are separated and the mixture is converted into valuable commercial products. It is another object of our invention to provide a process for economically preparing a dispersion of sodium metal in an inert medium from a mixture containing sodium and calcium metals such as the filter sludge produced as a by-product in the electrolytic manufacture of sodium. It is a further object of our invention to provide an improved process for recovering calcium metal from mixtures containing calcium and an alkali metal.

These and other objects of our invention will become apparent as the following description proceeds, and the features of novelty which characterize our invention will be pointed out with particularity in the claim annexed to and forming a part of this specification.

Briefly, the objects of our invention can be accomplished by subjecting a mixture containing alkali metal in admixture with alkaline earth metal to vigorous agitation in the presence of an inert liquid at a temperature at which the alkali metal is in the molten state but below the temperature at which the liquid is vaporized. We have discovered that the agitation serves to separate the alkali metal from the alkaline earth metal and simultaneously disperse the alkali metal throughout the liquid so as to form a stable suspension or dispersion. If desired, the alkaline earth metal which remains as discrete crystals can then be recovered from the alkali metal dispersion or suspension by filtration, centrifugation or some such suitable means.

One preferred mode of operation of our invention can be conveniently described in relation to the treatment of the sodium-calcium sludge described above, but it is to be understood that our process is applicable to other mixtures containing an alkali metal in admixture with alkaline earth metal. For example, the teachings of our invention can be successfully applied to metal mixtures in which the alkali metal component is made up of one or more of the metals sodium, potassium or lithium, and the alkaline earth metal component is made up of one or more of the metals calcium, barium or strontium. In carrying out our process an inert liquid is added to the sodium-calcium sludge. The entire mixture is heated to a temperature at which the sodium becomes molten, but below the temperature at which the liquid would be vaporized, and subjected to vigorous agitation. This temperature is maintained during agitation, and the agitation is continued for a period of time sufficient to disperse the sodium content of the sludge throughout the liquid. During agitation the sodium is in the molten state and becomes separated from the calcium crystals and dispersed throughout the liquid in the form of small globules. We have found that upon cooling the entire reaction mixture these sodium globules do not agglomerate but remain in stable suspension as finely divided metallic sodium particles. These particles have been found to range in size from 1 to 30 microns and the suspension or dispersion differs from a true colloid only in this particle size since in a true colloid the particle size is generally less than 1 micron. The calcium, on the other hand, remains as discrete crystals now substantially free from the sodium and, if desired, can be separated from the sodium dispersion. This product may be used directly in many commercial applications where a highly reactive form of sodium is desired and where the presence of the calcium crystals will not be detrimental to the process. When it is desired to recover the calcium crystals a mechanical separation step can be employed utilizing, for example, filtration, centrifugation or gravity separation. The products obtained upon separation are a sodium dispersion substantially free of calcium, and calcium crystals which can be further purified so as to remove any traces of sodium by washing with hexanes or treating with alcohol.

For the efficient operation of our process it is necessary that the inert medium which serves as the dispersing medium be in the liquid state at the temperature and pressure at which the dispersing step is carried out. In the preferred form our process is performed using a dispersing medium which is liquid at room temperature although, as an alternative, a dispersing medium which is in the solid state at room temperature can be used. This dispersing medium should also be inert to both the sodium and calcium so that substantially no chemical reaction will take place between the metals and the liquid. Many compounds satisfy these requirements. We have found that heavy alkylate such as is produced in the refining process for manufacturing aviation fuels is well adapted for our process when treating mixtures of sodium and calcium since this liquid possesses a reflux temperature of about 165° C. and is inert to both the sodium and calcium. Examples of other inert compounds which can be used as the dispersing medium in our process are kerosene, n-octane, xylene, toluene, n-nonane, n-decane, n-undecane, cumene, ethyl benzene, diphenyl, diphenyl oxide, dimethyl ether of ethylene glycol, triphenylamine, anthracene, naphthalene and mesitylene.

As previously pointed out, once the metal mixture is treated so as to form the dispersion of alkali metal the alkaline earth metal which remains as discrete crystals can, if desired, be separated from the dispersion so as to leave the dispersion substantially uncontaminated by the alkaline earth metal. We have found that a very clean separation can be accomplished by settling and decantation if the dispersing medium which is used has a specific gravity equal to or greater than the specific gravity of the alkali metal but less than the specific gravity of the alkaline earth metal. For example, when mixtures of sodium and calcium are treated, tetralin can be used as the dispersing medium since this compound has a specific gravity which is equal to that of sodium. After dispersing the sodium and upon settling a very clean separation occurs between the calcium crystals and the sodium dispersion. Other relatively high density materials which can be used as a dispersing medium are, for example, decalin and heavy mineral oil.

The amount of dispersing medium which is added to the mixture, while not critical, is important. For efficient operation of our process the preferred range of proportions are 40 to 400 parts of dispersing medium to 60 parts of metal mixture. Higher concentrations of dispersing medium are desirable in some instances since this will result in lower viscosities of the entire mixture and thus permit the final separation of the alkaline earth metal from the dispersion to be accomplished readily by filtration. Concentrations of dispersing medium substantially in excess of the above values can be used.

It is desirable in some cases to add a dispersing agent so as to facilitate the formation of a stable alkali metal dispersion or suspension. The dispersing agent can be added to the dispersing medium prior to introducing the medium into the metal mixture or, as an alternative, the dispersing agent can be added during the agitation step. In general these dispersing agents can be any one or more of a large number of surface active agents made up principally of long chain fatty acids, and high molecular weight alcohols or esters. Examples of the fatty acids which can be used as dispersing agents are oleic, stearic, palmitic, lauric, heptoic and undecyclic acids. Other examples of such surface active agents which can be employed as dispersing agents are the alkyl aryl polyether alcohols such as Triton–X–100, the fatty acid esters of polyhydric alcohols such as Span, the ethylene oxide addition products of such esters as, for example, Tween and the addition products of long chain mercaptans and ethylene oxide, such as Sharples, non-ionic–218. Still other surface active agents can be employed, the above merely showing a representative list of the more common materials.

The amount of dispersing agent to be added is extremely small and in general represents less than 1 per cent by weight of the total. We have found, however, that our process can be operated without the use of such dispersing agents, and in some cases it is advantageous to omit the use of a dispersing agent. For example, when treating a sodium-calcium mixture, the sodium dispersion obtained in the separation step can then be made to yield bulk sodium by re-heating to a temperature above the melting point of sodium in the absence of agitation so that the dispersion is broken and the sodium is agglomerated.

Following the addition of the dispersing medium, or simultaneously therewith, the mixture, including the dispersing medium, is agitated while maintaining a temperature at which the alkali metal is molten but below the temperature at which the dispersing medium would be vaporized. By performing the agitation at relatively high speeds the alkali metal particles are sufficiently small to be be completely dispersed throughout the dispersing medium. This agitation can be carried out in any convenient manner. One method which we have found to give good results is the use of a high-speed counter-rotating mechanical stirrer. By "vigorous agitation" as used in this specification we mean the nature of agitation that is accomplished by means of a mechanical stirrer operated at speeds from 2,000 to 15,000 R. P. M. We have also found that the agitation and the formation of the dispersion can be conveniently accomplished in a conventional colloid mill, or a jet-pump method can be employed wherein a coarse suspension of the metal mixture in the dispersing medium is fed into a pump which propels the mixture against a rigid plate with great force while maintaining a temperature at which the alkali metal is in the molten state.

As previously described, the vigorous agitation results in the formation of a relatively stable dispersion of finely divided alkali metal in the dispersing medium. This dispersion can be used without further treatment in many commercial operations or, if desired, the dispersion can be separated from the alkaline earth metal which remains in the form of discrete crystals. When applying our process to mixtures of sodium and calcium we have found that this separation can be conveniently accomplished by filtration, settling and decantation, or centrifugation. Other conventional methods of mechanical separation such as flotation or elutriation can be employed. The entire mixture can be cooled prior to separation or the separation can be performed while maintaining the temperature at which the dispersing step was carried out. This latter alternative has been found to be advantageous when filtration is employed since at such a temperature the alkali metal particles will be in the molten state and thus have less tendency to plug or foul the filter medium. The hot filtration technique is also preferred when the process is carried out using a dispersing medium which is a solid at room temperature.

Our invention can best be understood by referring to the following working examples wherein the process of our invention is described in relation to a mixture containing sodium and calcium metals. All parts and percentages are on weight basis.

*Example I*

A mixture of 15 parts of the sodium-calcium sludge obtained in the electrolytic process for producing sodium was fused in 62 parts of heavy alkylate at a temperature of from 100 to 110° C. This mixture, including the alkylate, was vigorously agitated by means of a high-speed counter-rotating stirrer operating at 10,000 R. P. M. for a period of 20 minutes while maintaining the temperature at 100 to 110° C. During the agitation $\frac{1}{10}$ parts of "Tween 60" (sorbitan monostearate polyoxyalkylene derivative) was added as a dispersing agent. After cooling to room temperature the mixture was filtered through a 200 mesh screen. Gravity filtration was assisted by gentle stirring of the residue on the screen during filtration. The filtrate obtained was a stable dispersion of solid sodium particles in the alkylate, and the filter residue consisted of calcium crystals containing about 1 per cent sodium. Pure calcium crystals were obtained from this residue by washing with hexanes.

*Example II*

16 parts of a mixture containing sodium and calcium in which the calcium content constituted 45 per cent of the total was dispersed in 76 parts of tetralin at a temperature of 110–120° C. in the manner described in Example I. During the dispersing step 1/10 parts of "Tween 60" was added as dispersing agent. After the agitation had continued for ten minutes the stirrer was washed down with an additional 21 parts of tetralin. The agitation was stopped after a period of about 20 mintues and there had been formed a very stable dispersion of sodium in the tetralin. The entire mixture was allowed to stand for a period of fifteen hours at the end of which time calcium crystals had settled to the bottom of the container leaving the sodium dispersion substantially free of calcium. The dispersion was removed from this calcium residue by decantation, and the calcium was washed with hexane. Quantitative tests revealed a recovery of 97 per cent of the calcium originally present in the charge, and this recovered calcium had a purity greater than 95 per cent.

When the process of our invention is applied to mixtures of sodium and calcium which contain these metals in proportions different from that utilized in the above examples the procedures are the same and equally good results are experienced. Also, when it is desired to ultimately recover bulk sodium from the dispersion the process is carried out as described in the above examples except that the dispersion is formed without the aid of the dispersing agent. The dispersion formed in such a case is first separated from the calcium crystals and is thereafter heated to a temperature above the melting point of sodium in the absence of agitation so as to break the dispersion and precipitate metallic sodium.

As previously pointed out, a wide choice of dispersing media is available in the operation of our process. When, for example, xylene, toluene, n-decane, or ethyl benzene is used as dispersing medium the process can be carried out as described in the above examples and equally good results are obtained. Also, when it is desired to recover the alkaline earth metal crystals, filtration at the reaction temperature yields results which are substantially the same as indicated in Example I.

It is to be understood that the above examples are given only for the purpose of illustrating the mode of operation of our improved process of treating mixtures containing alkali metal and alkaline earth metal. While in the above examples a sodium-calcium mixture was treated, our process can be applied with equal success to mixtures containing other alkali metals and alkaline-earth metals. We therefore do not intend that our invention be limited to the specific embodiments described herein, and we intend by the appended claim to cover all modifications within the spirit and scope of our invention.

We claim:

A process for treating a mixture consisting essentially of sodium in admixture with calcium so as to recover said calcium, comprising agitating said mixture in the presence of an organic liquid inert to said sodium and calcium at a temperature at which said sodium is in the molten state but below the temperature at which said liquid is vaporized, and physically separating said calcium from the resulting mixture.

References Cited in the file of this patent

UNITED STATES PATENTS

| | | |
|---|---|---|
| 1,938,670 | Sullivan et al. | Dec. 12, 1933 |
| 2,029,998 | Gilbert | Feb. 4, 1936 |
| 2,296,459 | Schutte | Sept. 22, 1942 |